Oct. 6, 1931.  L. JOHNSON  1,825,957
DIFFERENTIAL ADJUSTMENT FOR ROLLS
Filed Jan. 20, 1927   2 Sheets-Sheet 1

INVENTOR
Lane Johnson
by his attorneys
Byrnes, Stebbins & Parmelee

Oct. 6, 1931.  L. JOHNSON  1,825,957
DIFFERENTIAL ADJUSTMENT FOR ROLLS
Filed Jan. 20, 1927    2 Sheets-Sheet 2

INVENTOR
Lane Johnson
by his attorneys

Patented Oct. 6, 1931

1,825,957

UNITED STATES PATENT OFFICE

LANE JOHNSON, OF PITTSBURGH, PENNSYLVANIA, ASSIGNOR TO UNITED ENGINEERING AND FOUNDRY COMPANY, OF PITTSBURGH, PENNSYLVANIA, A CORPORATION OF PENNSYLVANIA

DIFFERENTIAL ADJUSTMENT FOR ROLLS

Application filed January 20, 1927. Serial No. 162,338.

This invention relates to a screwdown mechanism for rolling mills, and more particularly to a rolling mill screwdown mechanism employing a differential gearing. The present invention constitutes an improvement on the differential screwdown mechanism shown in the patent of F. C. Biggert, Number 1,576,266, dated March 9, 1926.

With the screwdown mechanism shown in the said patent to F. C. Biggert, either of the adjusting screws can be operated more rapidly than the other, so as to provide for adjusting one end of the roll with respect to the other. Where one end of the roll only is adjusted, as occurs in the use of a mechanism such as shown in the said Biggert patent, the gage or thickness of the pass between the rolls is varied at the center of the rolls. This is undesirable, because, in the adjusting of the rolls, it is desirable to maintain the gage constant at the center of the rolls.

Figure 1:
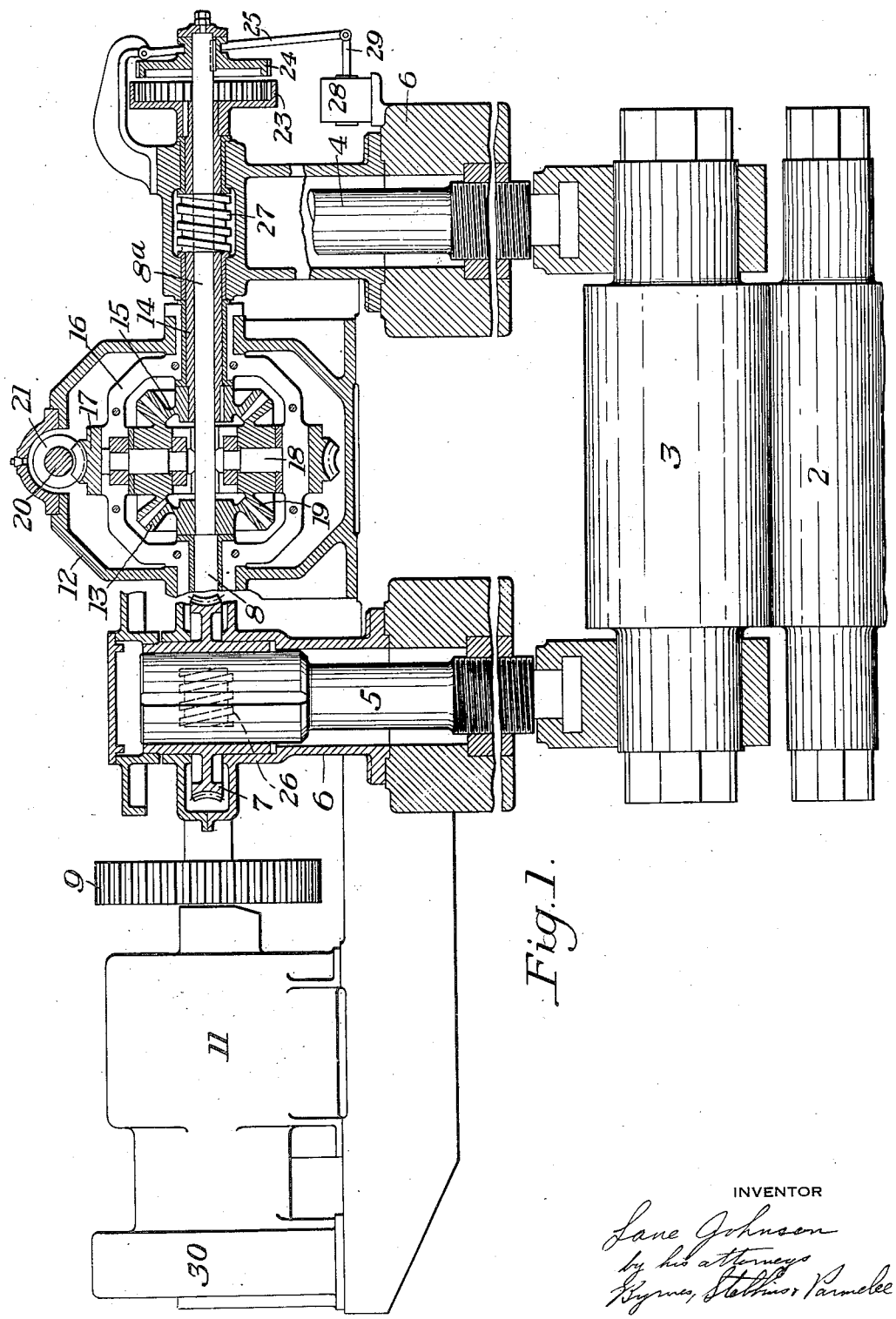
Figure 2:
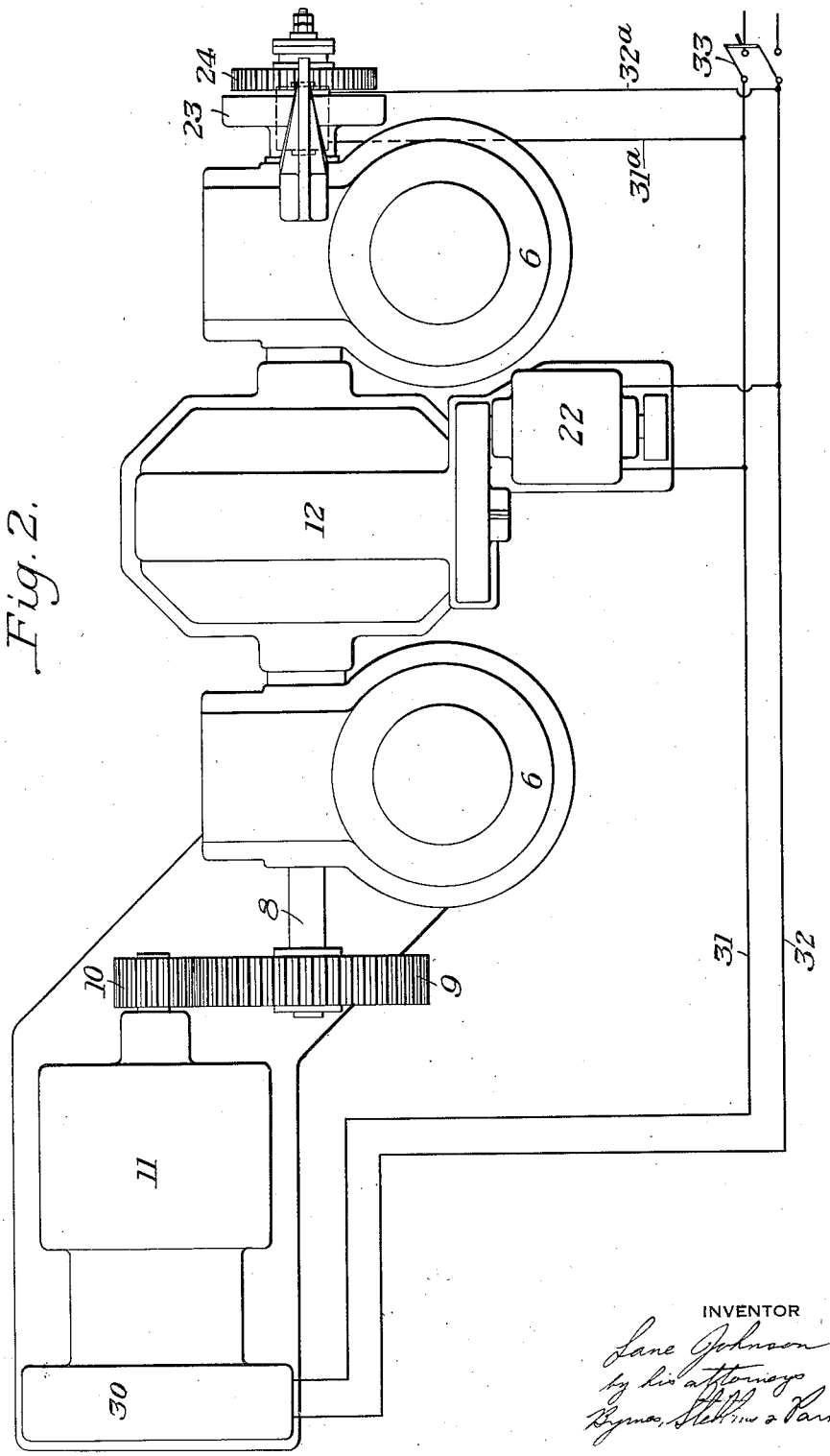

According to the present invention, there is provided a mechanism wherein both screws may be raised or lowered simultaneously at the same speed and wherein one screw may be raised as the other is lowered, simultaneously and at the same speed. By raising one screw while lowering the other, the necessary relative adjustment between the opposite ends of the rolls is secured and the gage at the center of the rolls is maintained constant. The invention may be readily understood by reference to the accompanying drawings, which illustrate more or less diagrammatically, one embodiment of the invention and in which Figure 1 represents a staggered section through the screwdown operating section with the main driving motor shown in elevation; and Figure 2 is a plan view of the apparatus shown in Figure 1.

In the drawings:

2 designates a lower intermediate roll of a mill, and 3 is the upper roll to be adjusted. 4 and 5 designate screw shafts for raising and lowering the opposite ends of the roll 3. Surrounding the upper end of each of the vertical shafts 4 and 5 is a housing 6, in which is contained a worm wheel 7. This wheel is splined to the top of the shaft which it drives. Figure 1 shows the worm wheel 7 for the shaft 5 in section, but the plane of the section is staggered so that this wheel is not shown for the shaft 4. At 8 is a main driving shaft having a gear wheel 9 thereon which is driven by the pinion 10 of a main driving motor 11. The shaft 8 extends into a differential housing 12 which is preferably located between the two screws, and carries a beveled gear 13.

Opposite the shaft 8 and in alignment therewith is a quill shaft or sleeve 14 which extends into the differential housing and which is provided with a beveled gear 15 opposed to the beveled gear 13. Rotatable about the inner end of the shaft 8 and the inner end of the quill shaft 14 is a cage 16, having a worm wheel 17 around its periphery at the center thereof. This cage is provided with radial shafts 18 for supporting planetary beveled gears 19, meshing with the beveled gears 13 and 15. Extending into the top of the housing 12 is a shaft 20 having a worm 21 thereon for engagement with the worm wheel 17 on the cage 16. The shaft 20 is driven by a motor 22, hereinafter called the differential driving motor. The shaft 8 has a reduced extension 8a that projects through the differential and through the quill shaft 14. On the outer end of the quill shaft 14 is an internally toothed ring 23 providing one part of a clutch. On the projecting end of the shaft extension 8a is a slidable disk 24, which is slidably keyed to the shaft extension 8a and which has a toothed periphery for engagement with the internal teeth of the member 23. The disk 24 is moved into and out of engagement with the member 23 by an operating yoke of any well known or preferred construction.

On the shaft 8 is a worm 26 engaging the worm wheel 7 on the top of the shaft 5. On the quill shaft 14 is a similar worm 27 for driving the shaft 4. The worm 26 is reversed with respect to the worm 27. One of the worms is left hand and the other is right hand.

The clutch operating lever or yoke 25 may be operated in any suitable manner. I have shown an electromagnetic device 28 for this purpose, the armature 29 of this device being pivotally connected to the lower end of the lever 25.

As is customary in mechanism of this kind, the driving motor 11 is provided with a brake having spring mechanism for setting it and an electromagnet for releasing it. This brake is diagrammatically represented at 30 and is released automatically when the motor is energized, through the usual connections (not shown). Brakes of this type used in this connection are well known to those skilled in the art, and since it forms no part of the present invention. the brake has not been specifically illustrated. Brakes of this type as ordinarily constructed are released by electro-magnetic means and are self-actuating, springs usually being provided for this purpose. In the diagram I have shown the wires 31 and 32 as leading to the electro-magnetic releasing means. I have shown the differential driving motor 22 as also being energized through wires 31 and 32. In like manner, the electromagnetic clutch-operating device is energized to clutch engaging position by current supplied from the wires 31 and 32, wires 31ª and 32ª being shown as leading from the wires 31 and 32 to the device 28. The switch 33 is provided for connecting the lines 31 and 32 with a source of current supply. When the switch 33 is closed. the brake magnet, the differential driving motor and the clutch operating device 28 are simultaneously energized. This arrangement is merely illustrated as indicating that the several devices may be interconnected so as to render the operation of the screwdown mechanism, as hereinafter described, more simple, but it will be understood that the invention is not concerned with the particular manner in which the various electrical devices are intercontrolled. The brake magnet will also be energized and the brake released automatically when the motor 11 is started, in the manner customary with mill type motors.

The arrangement is such that with the brake 30 released and the motor 11 operating, the shaft 8 is driven in one direction. The differential motor 22 is not energized at this time, so that the worm 21 holds the cage 16 from rotating. At this time the clutch member 24 is disengaged from the clutch member 23. The rotation of the shaft 8 will therefore cause the pinion 13 to rotate. and the pinion 15 will be rotated through the planetary gears 19 in the reverse direction. The quill shaft 14 will then be revolving in an opposite direction to the shaft 8. Since the worms 26 and 27 are of opposite direction and the respective shafts on which they are carried are revolving in the opposite directions, the two screws 4 and 5 will move up or down simultaneously at the same rate. Should it be desirable to effect a differential adjustment, i. e. adjust one end of a roll with reference to the other, the motor 11 is stopped and automatically the brake 30 is set.

With the intercontrol of the electrical devices herein referred to, the closing of switch 33 released of the brake 30 and also energizes the magnetic device 28 to bring the clutch member 24 into engagement with the clutch member 23. This, in effect, locks the shaft 8 with respect to the quill shaft 14 so that they cannot revolve in opposite directions. Then, as the differential motor 22 operates, the cage 16 is driven. Since the shafts 8 and 14 are locked together, the worms 26 and 27 will revolve in the same direction at the same speed. Since these two worms are reversed, one of the screwdown shafts 4 or 5 will be raised while the other screwdown shaft will be moved in the opposite direction at the same speed and to the same extent.

In this way, relative adjustment between opposite ends of the roll 3 is secured, but the setting or spacing of the rolls is not shifted to either side of the center of the mill. Inasmuch as the one end of the roll is lowered to the same extent that the other end is raised, the adjustments are effective about the middle of the roll pass, and the pass at the center of the rolls is thus maintained constant. This is the advantage of the present invention.

While I have specifically illustrated and described a particular apparatus for effecting the objects of the invention, it will be understood that such apparatus can be constructed in various ways and that various changes and modifications can be made therein without departing from the spirit of the invention and under the scope of the following claims.

I claim:

1. In a rolling mill, a roll, a screwdown mechanism at each end of the roll, and a common means for simultaneously adjusting the screwdown mechanisms at opposite ends of the roll at the same rate in opposite directions to the same extent.

2. In a rolling mill, a roll, a screwdown mechanism at each end of the roll, and means including a differential gear for simultaneously adjusting the screwdown mechanisms at opposite ends of the roll in opposite directions or in the same direction to the same extent.

3. In a rolling mill, a roll, a screwdown mechanism at each end thereof, means for simultaneously operating the screwdown mechanisms at both ends of the roll in the same direction, and means for simultaneously operating the screwdown mechanisms at opposite ends of the roll in opposite directions.

4. In a rolling mill, a roll having separately movable vertically adjustable bearings at the ends thereof, selectively operable means for adjusting both ends of the roll at the same time in the same direction, and other selectively operable means for simultaneously adjusting opposite ends of the roll in opposite directions.

5. In a rolling mill, a roll, a screw mechanism at each end of the roll, means including a differential gear for operating the screw mechanisms in opposite directions, said screw mechanisms being reversed with respect to each other, and means for rendering said differential gearing ineffective for operating the screw mechanisms in the same direction.

6. In a rolling mill, having a roll adjusting screw at each side thereof, driving means for each screw, one of said driving means being reversed with respect to the other, a drive shaft for one of the screws, a drive shaft for the other screw, a differential gearing operatively interposed between the two shafts, whereby one of the shafts may be driven reversely to the other, means for holding the two shafts against rotation in opposite direction, and means for driving the differential when the two shafts are so held.

7. In a rolling mill, having a roll adjusting screw at each side thereof, with driving means for each screw, said screws and driving means being reversed to each other, a differential gearing connecting the driving means of the respective screws for rotating said driving means in reverse directions, a main driving motor, means for connecting said driving means to revolve in the same direction, and a differential driving motor for operating the differential when the said screw driving means are connected to revolve in the same direction.

8. In a rolling mill, having a roll adjusting screw at each side thereof, a driving gear wheel for each screw, a shaft for driving the driving wheel of one screw, a motor for driving said shaft, a shaft for driving the driving wheel of the other screw, a reverse gear operatively interposed between the two shafts, whereby the second may be driven from the first in a reverse direction, means for selectively connecting the two shafts to revolve in the same direction, and means for driving the two shafts when so connected, the screws at the opposite sides of the roll being arranged to rotate in opposite directions to move the opposite ends of the roll in the same direction.

9. In a rolling mill, having an adjusting screw at each side thereof, driving means for the two screws, said screws and driving means being reversely arranged with respect to each other, selectively operable means for operating the driving means for the two screws simultaneously in opposite directions, and selectively operable means for rotating the driving means for the two screws simultaneously in the same direction.

10. In a rolling mill, having a roll adjusting screw at each side thereof, means including a shaft for driving one of the screws, means including a second shaft for driving the other screw, said screws and the driving means therefor being reversed with respect to each other, and driving means for one of the shafts, a reversing gear operatively connecting the first shaft and the second shaft, a clutch for selectively connecting the two shafts to render the reversing gear ineffective, and means for rotating the two shafts when the clutch is in operative position.

11. In a rolling mill, having an adjustable roll and an adjusting mechanism for each end of the adjustable roll, said mechanisms being reversed, selectively operable means for driving the two mechanisms together in opposite directions, and selectively operable means for driving the two mechanisms together in the same direction.

12. The combination with a rolling mill, having an adjustable roll and having adjusting means for each end of the adjustable roll, of a common driving mechanism for simultaneously driving the adjusting means in opposite directions, a selectively operable motor actuated means for simultaneously driving both mechanisms in the same direction.

13. In a rolling mill, having an adjustable roll and an adjusting mechanism for each end of the adjustable roll, a drive shaft for each adjusting mechanism, a reversing gear operatively interposed between the drive shafts for the respective adjusting mechanisms, a main driving motor operatively connected with one of the shafts, a clutch for operatively connecting the two shafts, a second motor for driving the two shafts when the said clutch connects the two, the respective adjusting mechanisms being operatively reversed to each other.

14. In a rolling mill, having an adjusting roll, and an adjusting mechanism for each end of the adjustable roll, the said mechanisms being reversed, a shaft for driving one mechanism, a second shaft for driving the other mechanism, a reversing gear operably interposed between the two shafts, a motor for driving one of the shafts, an electric brake for said motor, a selectively operable clutch for directly connecting the two shafts to render the reversing gear inoperative, electromagnetic means for operating the clutch, and a second motor for driving the two shafts when said clutch is in operative position.

15. In a rolling mill, having an adjusting roll, and an adjusting mechanism for each end of the adjustable roll, the said mechanisms being reversed, a shaft for driving one mechanism, a second shaft for driving the other mechanism, a reversing gear operably interposed between the two shafts, a motor for driving one of the shafts, and electric brake for said motor, a selectively operable clutch for directly connecting the two shafts to render the reversing gear inoperative, electromagnetic means for operating the clutch, and a second motor for driving the two shafts when said clutch is in operative position, said brake, electromagnetic clutch operating means, and the second motor being electrically interconnected.

16. In a rolling mill, having an adjusting roll, and an adjusting mechanism for each end of the adjustable roll, the said mechanisms being reversed, a shaft for driving one mechanism, a second shaft for driving the other mechanism, a reversing gear operably interposed between the two shafts, a motor for driving one of the shafts, an electric brake for said motor, a selectively operable clutch for directly connecting the two shafts to render the reversing gear inoperative, electromagnetic means for operating the clutch, and a second motor for driving the two shafts when said clutch is in operative position, said brake, electromagnetic clutch operating means, and the second motor being included in a common circuit, and a single control switch for said circuit.

17. The combination with a rolling mill having an upper and a lower roll, the ends of the upper roll being independently adjustable up and down, of roll adjusting mechanism including a selectively operable means for simultaneously adjusting opposite ends of the upper roll in opposite directions to the same extent, whereby the maximum distance between the rolls can be kept at the center of the rolls, and a selectively operable means for raising and lowering opposite ends of the roll simultaneously.

In testimony whereof I have hereunto set my hand.

LANE JOHNSON.